United States Patent [19]
Kruchowy et al.

[11] Patent Number: 5,339,023
[45] Date of Patent: Aug. 16, 1994

[54] NONDESTRUCTIVE TESTING APPARATUS FOR DETERMINING THE ORIENTATION OF REINFORCING BARS WITHIN A CONCRETE STRUCTURE

[75] Inventors: Roman Kruchowy, Somis; Dan Goff, Ventura; Anthony Smith, Oxnard, all of Calif.

[73] Assignee: The United States of America as represented by the Secretary of the Navy, Washington, D.C.

[21] Appl. No.: 991,939

[22] Filed: Dec. 17, 1992

Related U.S. Application Data

[63] Continuation-in-part of Ser. No. 860,742, Mar. 25, 1992, abandoned.

[51] Int. Cl.[5] .......................... G01B 7/10; G01B 7/14; G01B 7/26; G01V 3/165
[52] U.S. Cl. ................... 324/67; 324/207.26; 324/226; 324/229; 324/326; 364/507; 364/561
[58] Field of Search ............... 324/67, 207.16, 207.17, 324/207.26, 226, 229, 239–242, 326–329; 364/507, 561–563

[56] References Cited

U.S. PATENT DOCUMENTS

| | | | |
|---|---|---|---|
| 4,531,091 | 7/1985 | Kusenberger et al. | 324/242 |
| 4,837,489 | 6/1989 | McFee | 324/67 |
| 4,837,509 | 6/1989 | Dodmann et al. | 324/239 X |

FOREIGN PATENT DOCUMENTS

3245155C1 12/1984 Fed. Rep. of Germany .

OTHER PUBLICATIONS

Valley, Rich; Instruction Manual for R-Meter Model C-4956 "IC Provides optimal Lead-Acid Battery Charging Cycle"; EDN; Oct. 31, 1985, pp. 163-178.
"Underwater Concrete Inspection Equipment". A. Smith et. al. NCEL Tech Note N-1828; Apr. 91.

*Primary Examiner*—Gerard R. Strecker
*Attorney, Agent, or Firm*—David S. Kalmbaugh; Melvin J. Sliwka; John L. Forrest, Jr.

[57] ABSTRACT

A measuring apparatus which accurately locates reinforcing bars in underwater concrete structures such as piers, retaining walls, easements and the like and measures the amount of concrete covering each reinforcing bar. The measuring apparus comprises a probe which generates a magnetic field and which is moved over the surface of the underwater concrete structure under test. When the poles of the magnetic field are in parallel alignment with and directly over a reinforcing bar within the structure a disturbance occurs in the magnetic field with the magnitude of the disturbance being indicative of the depth of concrete covering the reinforcing bar. An electronics module electrically coupled to the probe provides an analog output signal which is indicative of the distance between a reinforcing bar within the concrete structure under test and the probe. This analog signal is supplied to a meter which provides a visual indication of the location of the reinforcing bar and a microprocessor which then calculates the depth of the reinforcing bar within the concrete sructure.

7 Claims, 7 Drawing Sheets

5,339,023

NONDESTRUCTIVE TESTING APPARATUS FOR DETERMINING THE ORIENTATION OF REINFORCING BARS WITHIN A CONCRETE STRUCTURE

BACKGROUND OF THE INVENTION

This application is a continuation-in-part of U.S. patent application Ser. No. 07/860,742 filed Mar. 25, 1992, now abandoned.

FIELD OF THE INVENTION

The present invention relates generally to an apparatus for locating reinforcing steel in a concrete structure and in particular, to a nondestructive testing apparatus which measures the disturbance in a magnetic field in the presence of a ferrous material such as a reinforcing bar or rebar in an underwater concrete structure to determine the location and orientation of the rebar within the structure.

DESCRIPTION OF THE PRIOR ART

Naval concrete underwater structures include piers, retaining walls, easements and the like. Over time fresh water and seawater will have an adverse effect on such underwater concrete structures in the form of wear and damage which necessitates inspection of the structures and if necessary repair or replacement of the structures.

In the past visual inspection of underwater concrete structures has been used to determine the condition of the structures. The qualitative data obtained from visual inspection is often inadequate to accurately assess the condition of the structure. In particular, a visual inspection of an underwater concrete will often fail to identify an internal defect within the structure.

A need therefore exist for a measuring apparatus which provides a long sought solution to the problem of accurately measuring internal damage and deterioration to underwater concrete structures such as piers, retaining walls, easements and the like.

SUMMARY OF THE INVENTION

The purpose of the present invention is to provide a measuring apparatus which accurately locates reinforcing bars in underwater concrete structures such as piers, retaining walls, easements and the like and measures the amount of concrete covering each reinforcing bar. The measuring apparatus of the present invention comprises a probe which generates a magnetic field and which is moved over the surface of the underwater concrete structure under test. When the poles of the magnetic field are in parallel alignment with and directly over a reinforcing bar within the structure a disturbance occurs in the magnetic field with the magnitude of the disturbance being indicative of the depth of concrete covering the reinforcing bar. An electronics module electrically coupled to the probe provides an analog output signal which is indicative of the distance between a reinforcing bar within the concrete structure under test and the probe. This analog signal is supplied to a meter which provides a visual indication of the location of the reinforcing bar and a microprocessor which then calculates the depth of the reinforcing bar within the concrete structure.

It is therefore an object of the present invention to provide a general condition assessment of an underwater concrete structure such as a pier, retaining wall, easement or the like.

It is another object of the present invention to provide a means for quantifying the deterioration of an underwater concrete structure.

It is a yet another object of the present invention to provide a means whereby a reinforcing bar in an underwater concrete structure can be accurately located;

It is still another object of the present invention to provide a means whereby the orientation of a reinforcing bar within an underwater concrete structure can be determined.

It is a further object of the present invention to provide a means for the nondestructive testing of an underwater concrete structure.

It is yet a further object of the present invention to provide a means whereby the depth of a reinforcing bar within an underwater concrete structure can be accurately determined.

Still further objects, advantages and novel features of the present invention will become apparent from the following detailed description of the invention when considered in conjunction with the drawings.

DETAILED DESCRIPTION OF THE PREFERRED EMBODIMENT

Figure 1A:
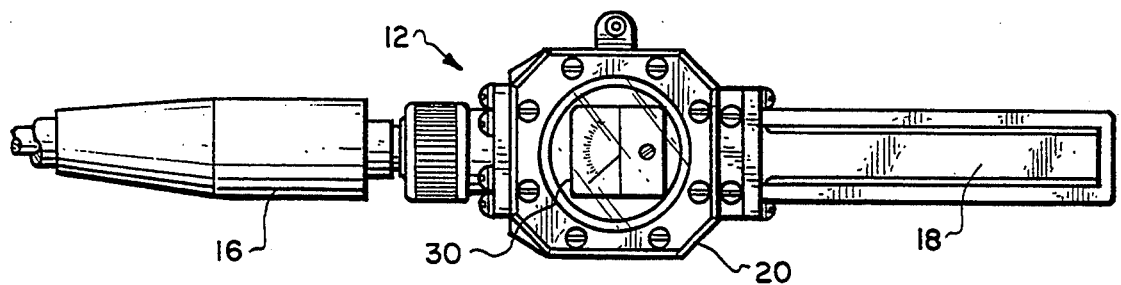
FIGS. 1a, 1b, 1c illustrate the underwater test probe used with the nondestructive testing apparatus of the present invention.

Referring to FIGS. 1a, 1b, 1c and 2a the nondestructive testing apparatus constituting the present invention comprises an underwater test probe assembly 12, a data acquisition and processing circuit 14 and an umbilical cord 16 which electrically connects the underwater test probe assembly 12 to the data processing circuit 14. The underwater test probe assembly 12 includes a commercially available test probe 18 which was modified for underwater usage by attaching to probe 18 a pressure housing 20 and waterproofing the probe 18 by using epoxy 21 to attach a thin delrin wear pad 22 over each of the exposed metal tips 24 and 26 of probe 18.

Figure 3:
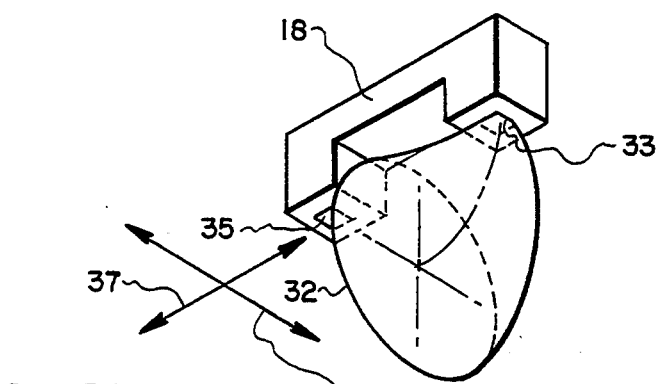
FIG. 3 illustrates the shape of the magnetic field generated by the test probe of the present invention.
Figure 2A:
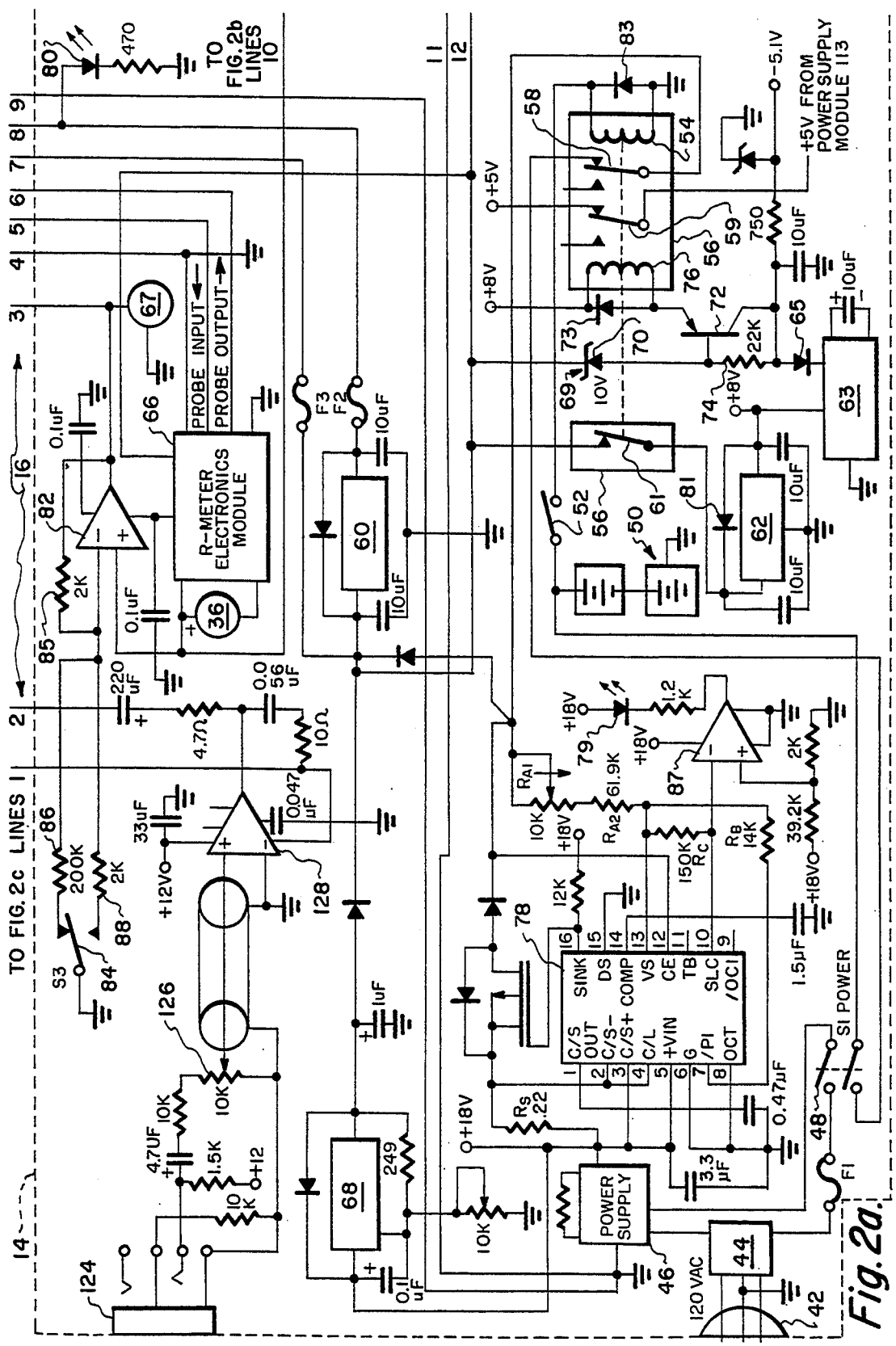
FIGS. 2a, 2b and 2c are detailed electrical schematics of the electronics for the nondestructive testing apparatus of the present invention.
Figure 4:
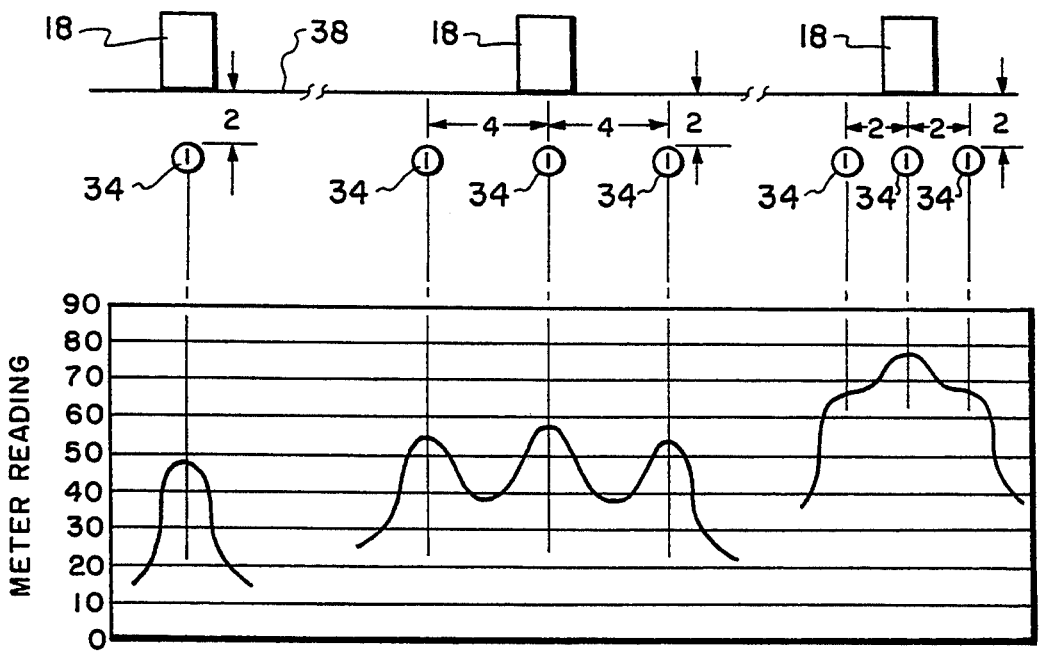
FIG. 4 is a graph illustrating the intensity of the magnetic field reading provided by the present invention as a function of center-to center distance between reinforcing bars within a concrete structure.

Referring to FIGS. 2a, 3 and 4, the test probe 18 used in the preferred embodiment of the present invention is a component of a commercially available James Instruments Inc. R-METER, Model C-4956 which is used to locate rebars in concrete structures. Test probe 18, in turn, generates a magnetic field 32 which as is best illustrated in FIG. 3 extends between the two pole faces 33 and 35 of probe 18 and is shaped like half of a doughnut. The intensity of magnetic field 32 is inversely proportional to the cube of the distance from pole faces 33 and 35, thus the disturbing effect of magnetic material in field 32 is also inversely proportional to the cube of its distance from pole faces 33 and 35. It should also be noted that it is relatively difficult for a magnetic field to propagate through non-magnetic material, such as concrete, when compared to a magnetic field's propagation through a magnetic material such as a reinforcing bar which is relatively easy.

When magnetic material, such as a reinforcing bar 34, FIG. 4, is placed in field 32 all lines of magnetic force of field 32 which can find a shorter distance from pole face 33 to pole face 35 by propagating through a magnetic material rather than non-magnetic material will pass through reinforcing bar 34, thereby distorting the shape of magnetic field 32. This results in a substantial reduction in the intensity of field 32 in directions away from the closest reinforcing bar within a concrete structure. This effect, coupled with the inverse cube law distribution of lines of magnetic force yields good discrimination between two reinforcing bars at different distances from the probe pole faces 33 and 35. The probe pole faces are also highly directional, that is a maximum deflection of the needles of a meter 30 (illustrated in FIG. 1a and 2c) and a meter 36 (illustrated in FIG. 2a) are obtained when axis 37 of the probe pole faces 33 and 35 are aligned with the axis of a reinforcing bar 34, thereby indicating the orientation of reinforcing bar 34. There is also a maximum deflection of the needles of meter 30 and meter 36 when probe 18 is positioned directly above a reinforcing bar 34 thereby providing for the shortest distance for the lines of magnetic force of field 32 from probe pole faces 33 and 35 to a reinforcing bar 34.

Figure 1B:
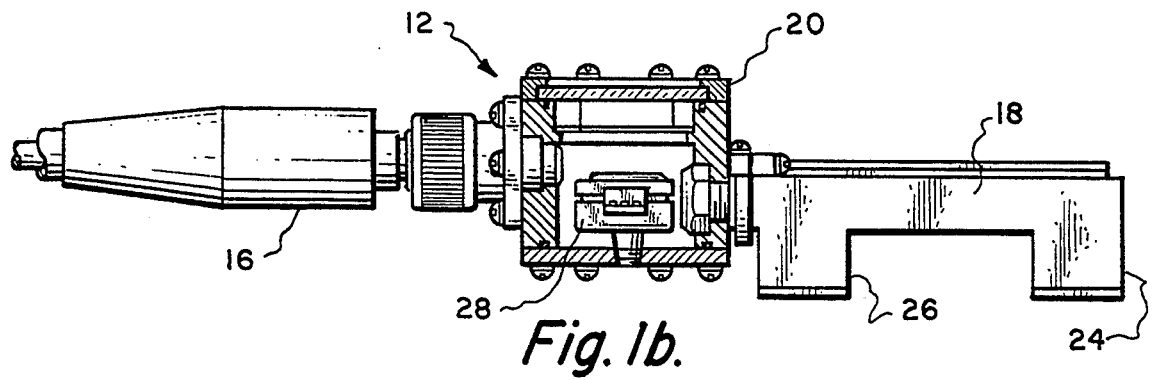
Figure 1C:
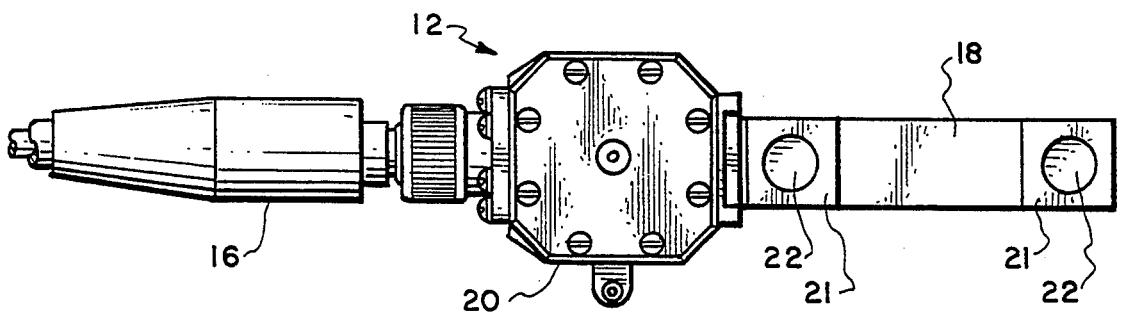

Referring to FIGS. 1a, 1b and 1c the pressure housing 20 includes a pressure transducer 28 positioned within housing 20 for measuring water pressure at the depth at which a diver is using the nondestructive testing apparatus of the present invention. Pressure housing 20 also includes meter 30 which allows the diver to locate reinforcing bars, commonly referred to as rebars, within an underwater concrete structure and to orientate probe 18 so as to measure the depth of concrete cover over a rebar within the concrete structure being tested.

In the preferred embodiment of the present invention meter 30 is a 0 to 5 VDC voltmeter, International Instruments Model 3048 and pressure transducer 28 is a 0–50 PSIA pressure transducer Data Instruments Model SA. It should be noted that meter 30 has a pair of backlighting lamps LMP1 and LMP2, FIG. 2c, which illuminate meter 30 so as to make meter 30 visible to a diver in an underwater environment.

There is shown a graph, FIG. 4, which illustrates the readings from meters 30 and 36 obtained from placing probe 18 at various center to center distances between reinforcing bars 34 when probe 18 is placed parallel to reinforcing bars 34. The direction of motion of probe 18 upon the surface of a concrete structure 38 being tested is perpendicular to the axis of the poles of probe 18 resulting in maximum meter 36 deflection as shown in FIG. 4. As the number of reinforcing bars 34 within concrete structure 38 increases and the distance between reinforcing bars 34 decreases the variations between meter readings decrease as shown in FIG. 4.

Also, it should be noted that there is a substantial increase in readings provided by meters 30 and 36 when the long axis of probe 18 is aligned with and is directly above the axis the reinforcing bar 34 as shown the graph on the right side of FIG. 4.

Figure 2B:
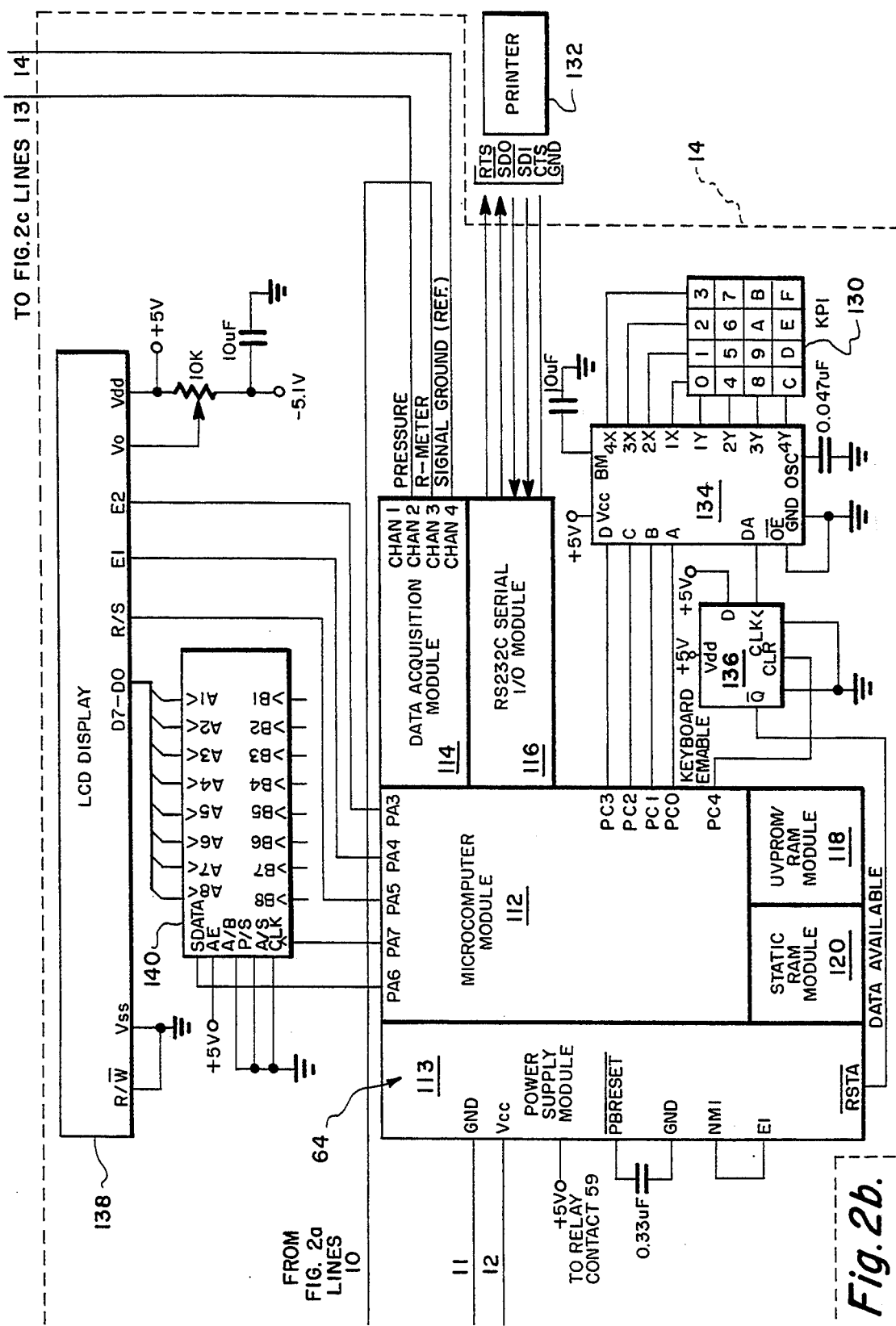

Referring now to FIGS. 2a, 2b and 4 data processing circuit 14 is located aboard a ship and is electrically connected to probe 18. All electrical wires connecting data acquisition and processing circuit 14 to probe 18, pressure transducer 28, meter 30 and a diver earphone 40 are positioned within umbilical cable 16.

Data acquisition and processing circuit 14 comprises a receptacle 42 which connects circuit 14 to an external one hundred twenty volt alternating current power source. Receptacle 42 is connected to a power line filter 44 for filtering the 120 VAC which is then provided to an eighteen volt power supply 46 through a switch 48. Closure of switch 48 by an operator also connects a battery power supply 50 to the data acquisition and processing circuit 14. Thus, the approximately 12 VDC which is required for data acquisition and processing circuit 14 is provided by either the eighteen volt power supply 46 or battery power supply 50 which includes two lead acid rechargeable batteries connected in series. Battery power supply 50 is a self contained power source which is fully charged at 14.8 VDC and which provides for approximately eight hours of continuous power to circuit 14.

Figure 2C:
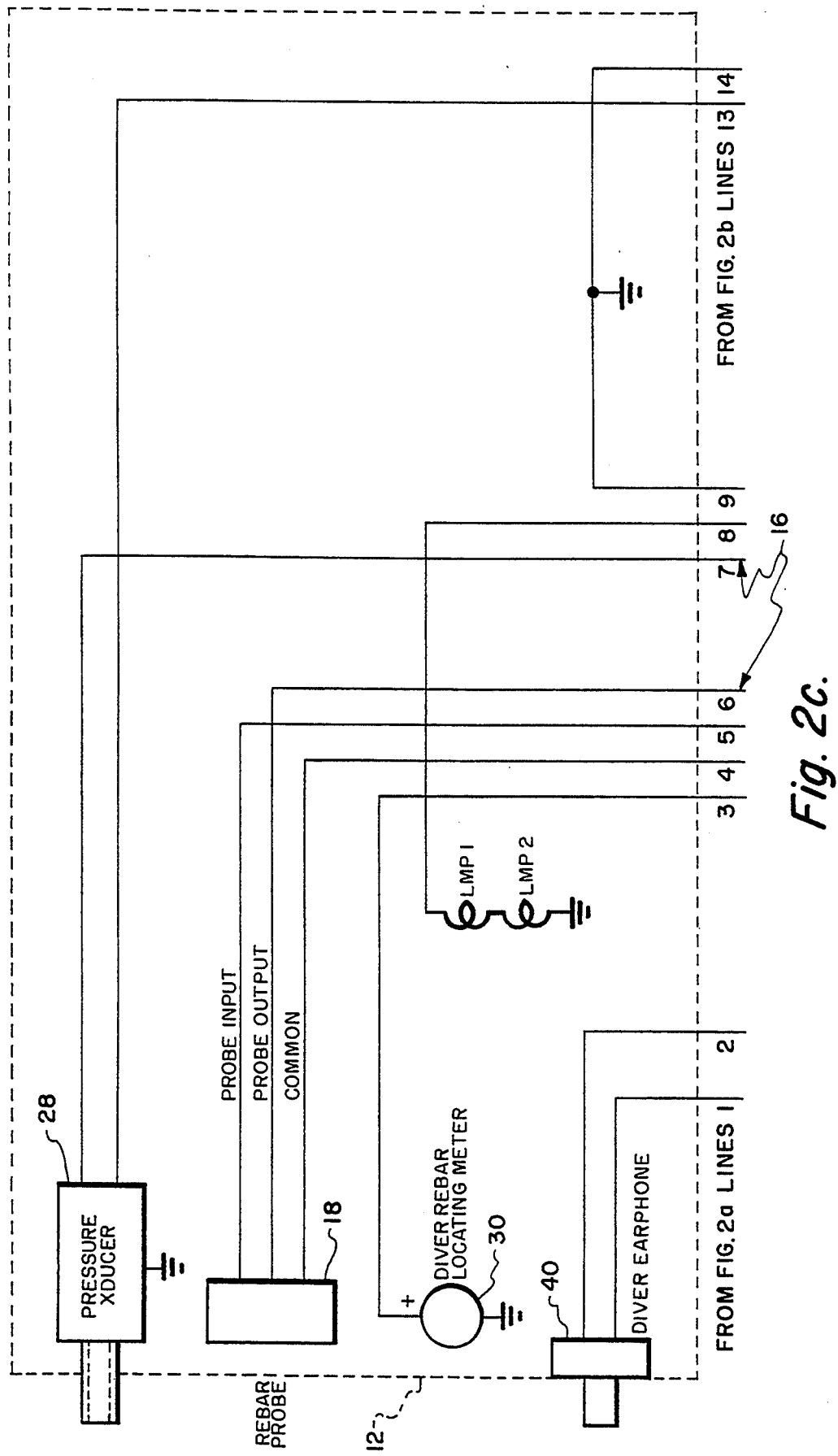

Referring to FIGS. 2a, 2b and 2c when data acquisition and processing circuit 14 is utilizing battery 50 as the only source of power for the electrical components of circuit 14, closure of a momentary contact switch 52 by the operator energizes a coil 54 within relay 56 which closes contacts 58, 59 and 61 of relay 56 to the set position as shown in FIG. 2a. Closure of contacts 58 and 61 connects battery 50 to voltage regulators 60 and 62 which provide respectively +6 VDC and +8 VDC. In addition, closure of momentary contact switch 52 connects battery 50 to a microcomputer 64, FIG. 2b and an R-Meter electronics module 66. Closure of contact 59 connects +5 VDC provided by power supply module 113, FIG. 2b to liquid crystal display 138, Flip-Flop 136 and sixteen bit key encoder 134.

In a similar manner, when power supply 46 is the source of power for circuit 14 closure of switch 48 connects power supply 46 to a voltage regulator 68 which provides an approximately +15.5 VDC to voltage regulators 60 and 62 as well as microcomputer 64 and R-Meter electronics module 66. Voltage regulator 62, in turn, supplies +8 VDC to a DC to DC converter 63 which, in turn provides at its output a voltage of approximately −6.8 VDC which is supplied to the cathode of diode 81. The voltage at the anode of diode 81 is approximately −6 VDC.

R-Meter electronics module 66, which is electrically connected to probe 18, provides an analog output signal which is supplied to meter 36 and is in response to the distortion of magnetic field 32 when probe 18 locates a rebar 34, FIG. 4, within a concrete structure 38, FIG. 4, under test. This analog output signal, in turn, is indicative of the distance between reinforcing bar 34 within the concrete structure 38 under test and test probe 18 and is inversely proportional to the distance between reinforcing bar 34 and probe 18. This analog output signal also provides an indication of the orientation of reinforcing bar 34.

This analog output signal provided by R-Meter Electronics Module 66 is also supplied to uncalibrated 0–5

VDC meters 30 and 67. The sensitivity of meters 30 and 67 is, in turn, adjusted by an amplifier 82 which either provides a gain of 1.01 or a gain of two depending upon the position of switch 84. When switch 84 is positioned such that the combination of resistors 85 and 86 is connected to the inverting input of amplifier 82 the gain provided by amplifier 82 is 1.01. Similarly, when switch 84 is positioned such that the combination of resistors 85 and 88 is connected to the inverting input of amplifier 82 the gain provided by amplifier 82 is two.

When the current drain on battery 50 results in a voltage of approximately 11.3 volts at the positive terminal of battery 50 a sensing circuit 69 comprising a ten volt zener diode 70, a transistor 72, diodes 65, 73 and 83 and a twenty two Kohm resistor 74 activates coil 76 of relay 56 opening contacts 58, 59 and 61 of relay 56 which disconnects battery 50 from the electrical components of data acquisition and power circuit 14. It should be noted that diodes 73 and 83 are protective diodes preventing back EMF when coils 54 and 76 are de-energized.

Referring to FIGS. 2a, 6, 7 and 8 when battery 50 is fully charged to approximately 14.8 VDC the base current for transistor 72 is approximately 23 $\mu$A, the base voltage is approximately 5.2 VDC and the current passing through coil 76 is approximately 3 mA. Zener diode 70, in turn, maintains the base voltage of transistor 72 at a voltage level which is sufficient to restrict current flow from the emitter to the collector of transistor 72 and thereby maintain coil 76 in a nonenergized state.

As battery 50 discharges the base voltage for transistor 72 decreases, the current through coil 76 increases and the base current for transistor 72 increases. When battery 50 discharges to 11.3 VDC, designated by reference numeral 77 on the graphs of FIGS. 6, 7 and 8, the voltage at the base of transistor 72 has dropped to 1.76 VDC allowing a current flow of 9.3 mA through coil 76 which is sufficient to energize coil 76. The energizing of coil 76 open contacts 58, 59 and 61 thereby disconnecting battery 50 from the electrical components of data acquisition and processing circuit 14.

Thus, sensing circuit 69 in combination with relay 56 protects battery 50 against over-discharge by isolating battery 50 from the electrical components of data acquisition and processing circuit 14. It should be noted that the transistor used in the preferred embodiment of the present invention is a Motorola Model 2N2907 PNP transistor, while the zener diode is a Motorola Model 1N4740A zener diode.

Figure 9:
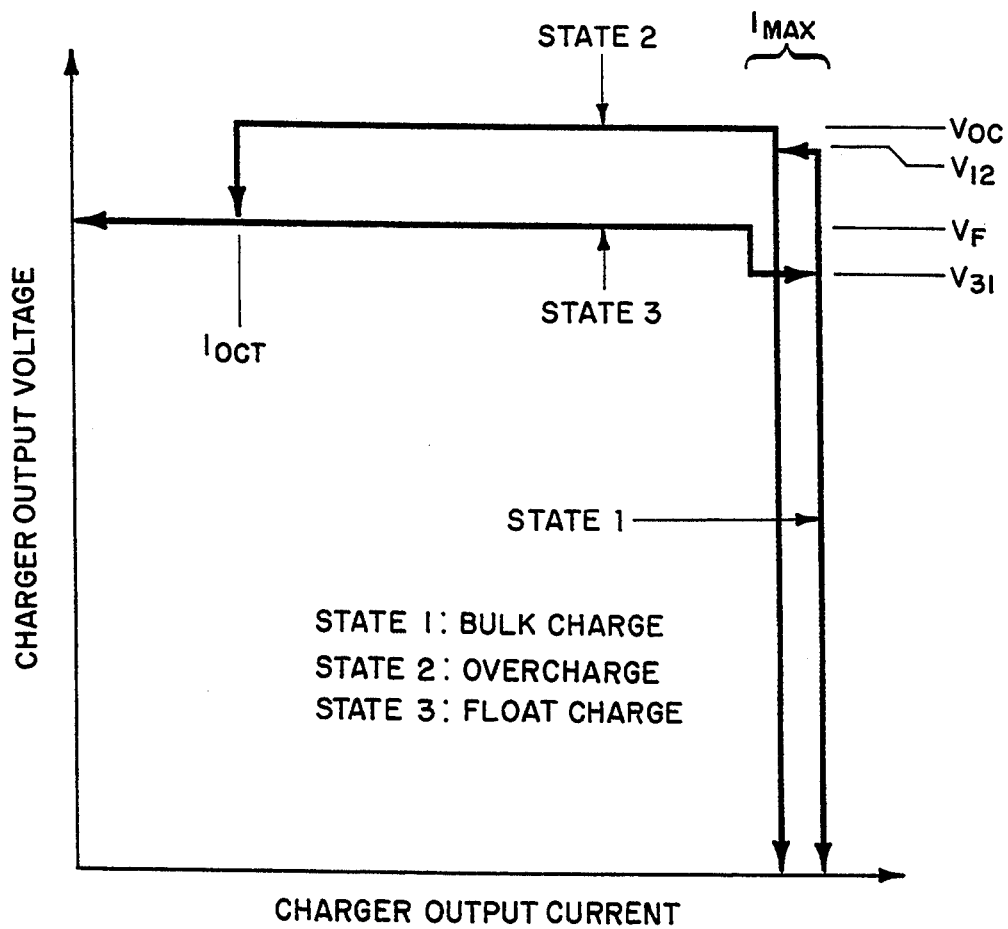
FIG. 9 is a graph illustrating the three charge states of the battery charger of the present invention.

Referring to FIGS. 2a and 9, data acquisition and processing circuit 14 also includes a battery charger 78 which is used to recharge battery 50 when power supply 46 is being utilized by circuit 14. A charge cycle begins with charger 78 in a bulk charge state (state 1) and charger 78 functioning as a constant current source that provides a constant current of $I_{max}$ to battery 50 which is defined by the following equation $$I_{MAX} = \frac{0.25 \text{ V}}{R_S} \tag{1}$$

where $R_S$ is 0.22 ohm. Either of two conditions, in turn, initiates the bulk-charge state at the beginning of the cycle. The first condition occurs when an operator connects receptacle 42 to 120 VAC and the second condition occurs while battery charger 78 is in the float state, that is battery charger 78 senses a low voltage on battery 50. This constant current bulk charge state returns seventy to ninety percent of the charge capacity of battery 50.

Charger 78 senses the battery voltage for battery 50. When the voltage reaches a transition threshold voltage $V_{12}$, charger 78 begins an overcharge cycle (state 2). $V_{12}$ is defined by the following equation $$V_{12} = 0.95 \ V_{OC} \tag{2}$$

where $V_{OC}$ is 14.8 VDC and is defined as the overcharge voltage. The overcharge voltage $V_{OC}$ may be calculated by using the following equation $$V_{OC} = V_{REF}\left(1 + \frac{R_A}{R_B} + \frac{R_A}{R_X}\right) \tag{3}$$

where $R_X$ is defined by the following equation $$R_X = \frac{R_B R_C}{R_B + R_C} \tag{4}$$

and $R_A = R_{A1} + R_{A2}$, $R_B$ is 14 Kohm and $R_C$ is 150 Kohm. $R_A$ is, in turn, determined by adjusting ten kohm variable resistor $R_{A1}$ such that the overcharge voltage is set at 14.8 VDC The overcharge voltage is, in turn, measured at the positive terminal of battery 50.

During the overcharge state, charger 78 regulates battery 50 at $V_{OC}$ until the charge rate drops to a specified transition current $I_{OCT}$ which is defined by the following equation $$I_{OCT} = \frac{0.025 \text{ V}}{R_S} \tag{5}$$

where $R_S$ is 0.22 ohm.

When the current provided by battery charger 78 tapers to $I_{OCT}$ with the battery's 50 voltage at $V_{OC}$ the capacity of battery 50 is nearly one hundred percent. At this point, battery charger 78 functions as a voltage regulator with a precise output defined by the following equation $$V_F = V_{REF}\left(1 + \frac{R_A}{R_S}\right) \tag{4}$$

where $R_A = R_{A1} + R_{A2}$, $R_s$ is 0.22 ohm and $V_{REF}$ is a reference voltage for battery charger 78 which is temperature dependent and is typically between 2.425 VDC and 2.18 VDC for a temperature range of zero to seventy degrees celsius.

The output voltage of battery charger 78 is now in the third state $V_{31}$, that is the float state. $V_{31}$ is, in turn defined by the following equation $$V_{31} = 0.9 \ V_F \tag{7}$$

At this time it should be noted that a complete written description of the operation of the battery charger circuit used in the present invention is provided in an article entitled "IC Provides Optimal Lead-Acid-Battery Charger Cycles" by Richard Valley published in Engineering Design News, Oct. 31, 1985, pages 161–178, which is incorporated by reference. It should also be noted that the constant current bulk charge first returns seventy to ninety percent of battery capacity and the remaining charge capacity is returned during the elevated constant voltage overcharge. In addition, it should be noted that external resistors $R_{A1}$, $R_{A2}$, $R_B$, $R_C$ and $R_S$ determine the programming of all battery charger's 78 voltage and current levels which are set forth in equations one through seven.

The float charge state is sensed by a comparator 87 which activates a light emitting diode 79 to indicate battery 50 is fully charged. The battery charger used in the preferred embodiment of the present invention is a Unitrode Model UC3906 battery charger.

It should also be noted that a light emitting diode 80 is connected to the output of voltage regulator 60 to indicate that either power supply 46 or battery 50 is operational and thereby supplying current to the electrical components of data acquisition and processing circuit 14.

It should be understood that probe 18, FIG. 2c, meter 36 and module 66, FIG. 2a, are components of the commercially available James Instruments R-METER, Model C-4956 and that any commercially available measuring apparatus which utilizes a probe generated magnetic field to locate magnetic materials within a concrete structure may be used as components 18, 36 and 66 of the nondestructive testing apparatus of the present invention.

Referring to FIG. 2b the microcomputer 64 used in the preferred embodiment of the present invention is a Model 2800 Eight Bit CMOS Microcomputer System manufactured by National Semiconductor. Microcomputer 64 comprises a Model MA 2800 Microcomputer 112, a Power Supply Module 113, a Model MA 2400 Data Acquisition Module 114, a Model MA 2232 Communications Interface 116, a Model MA 2732 UV-PROM/RAM Module 118 and a Model MA 2018 Static RAM Module 120.

The analog output signal provided by electronics module 66 is supplied to the channel 3 input of Data Acquisition Module 114 which converts the analog signal to digital data for processing by microcomputer 112. Channel 2 of Data Acquisition Module 114 receives an analog signal from a pressure transducer 28 which has a range of operation of 0 through 50 PSI. The analog signal provided by pressure transducer 28, in turn, indicates the pressure at the depth at which the underwater concrete structure is being tested. Channel 4 of Data Acquisition Module 114 receives signal ground.

Figure 5:
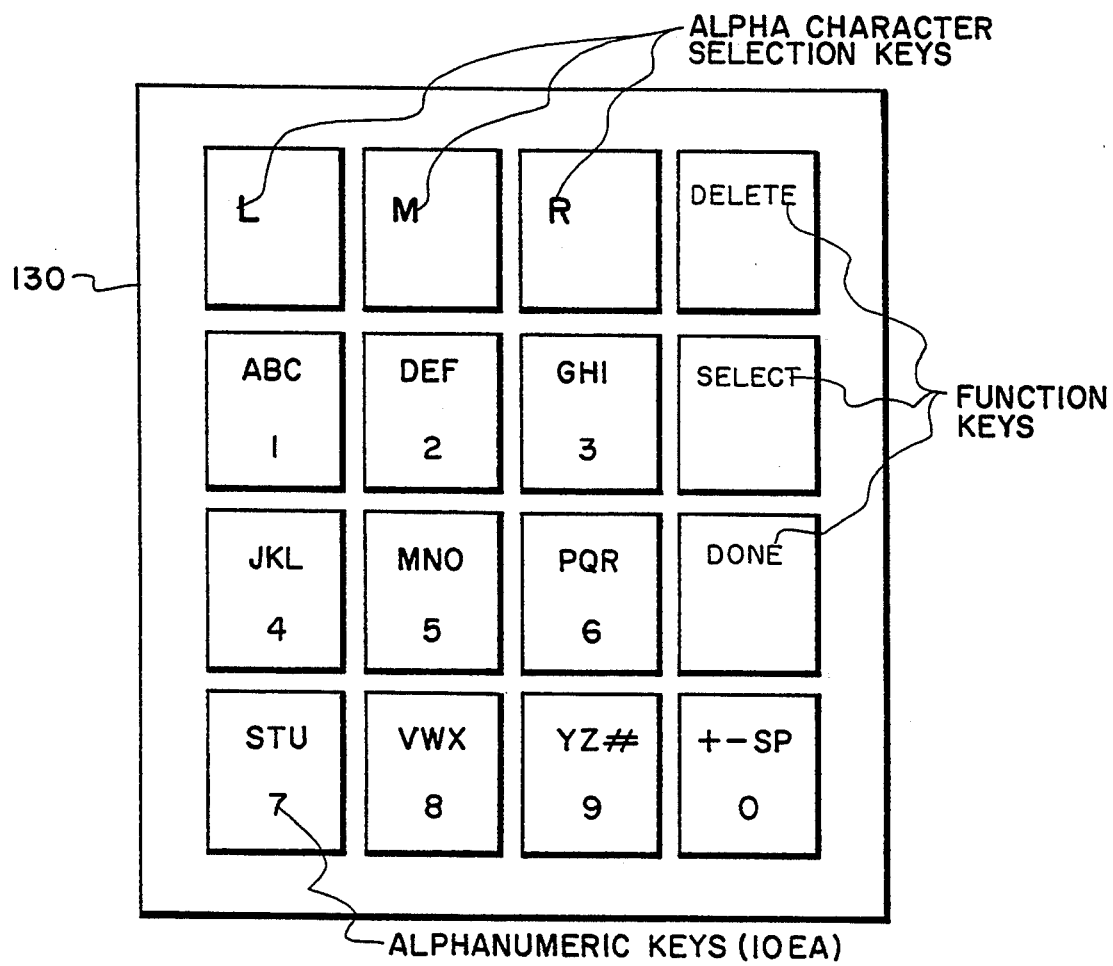
FIG. 5 illustrates the keypad for operator data entry which is used with the present invention.
Figure 6:
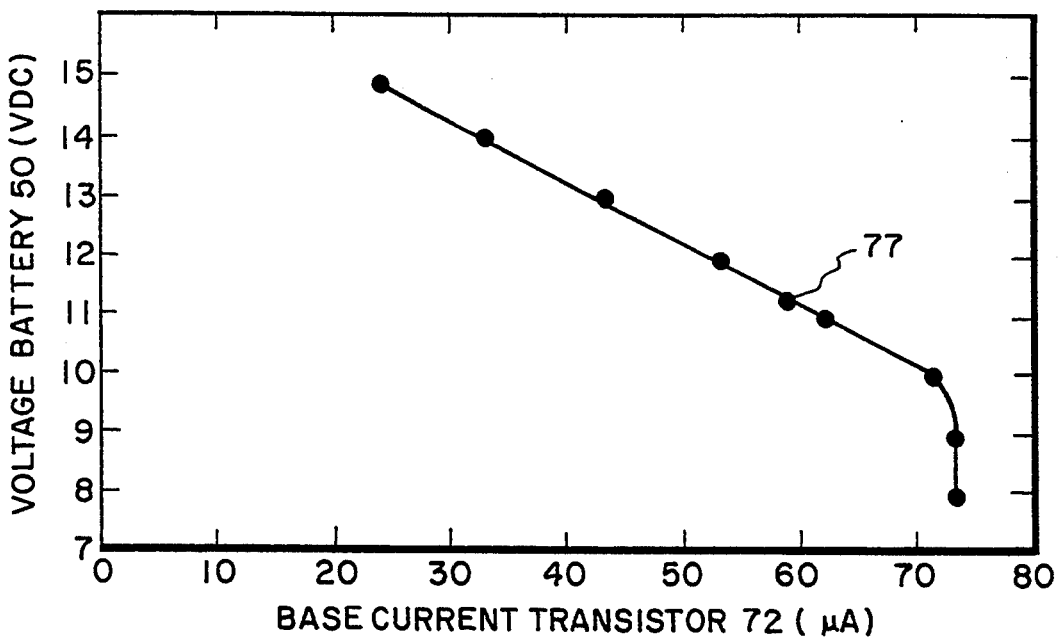
FIG. 6 is a graph illustrating the base current of transistor 72 versus the battery voltage for battery 50.
Figure 7:
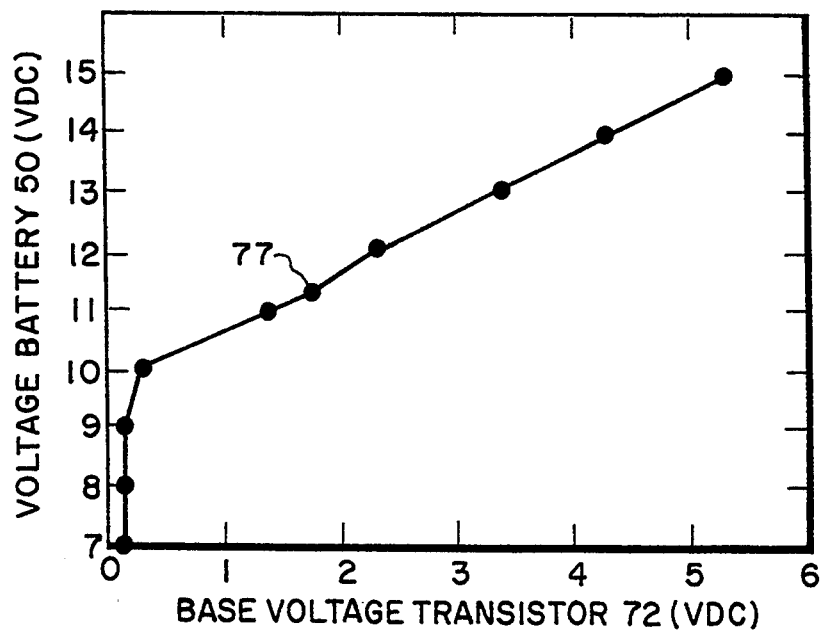
FIG. 7 is a graph illustrating the base voltage of transistor 72 versus the battery voltage for battery 50.
Figure 8:
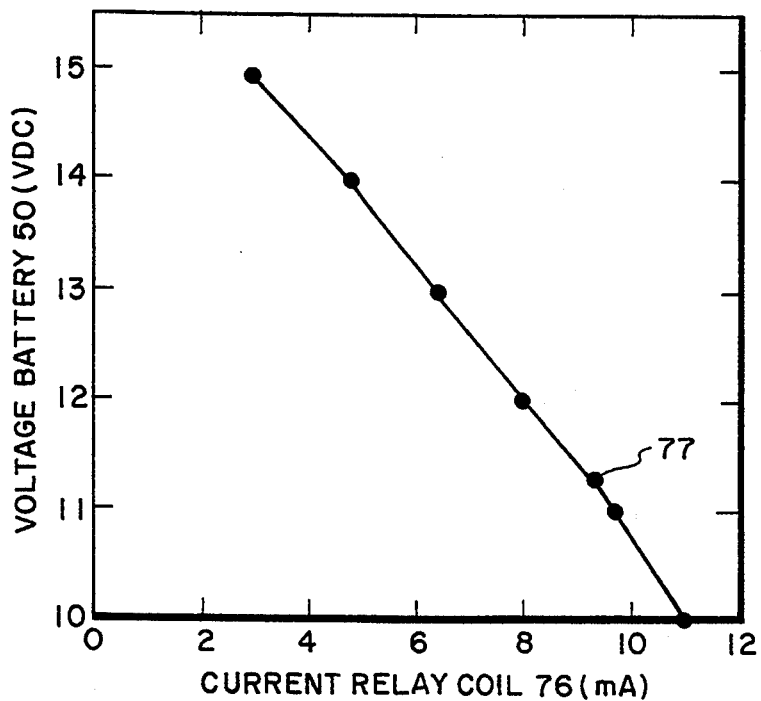
FIG. 8 is a graph illustrating the current passing through relay coil 76 versus the battery voltage for battery 50.

Referring to FIGS. 2b, 4 and 5, microcomputer 112 stores all data measured during an inspection of an underwater concrete structure into static ram module 120. The program listing for the software program used to calculate the depth of concrete cover over a reinforcement bar positioned in an underwater concrete structure being tested is stored in UVPROM/RAM Module 118 and is set forth below. An operator uses a keypad 130 to enter rebar number information which indicates the size of the reinforcing bar and which is set forth in the following table. This information is then used by microcomputer 112 to accurately calculate the amount of concrete cover over a reinforcing bar.

TABLE I

| Rebar Number | Rebar Size (Inches OD) |
|---|---|
| 03 | 3/8 |
| 04 | 1/2 |
| 05 | 5/8 |
| 06 | 3/4 |
| 07 | 7/8 |
| 08 | 1 |
| 09 | 1 1/8 |
| 10 | 1 1/4 |
| 11 | 1 3/8 |
| 12 | 1 1/2 |
| 13 | 1 5/8 |
| 14 | 1 3/4 |
| 15 | 1 7/8 |
| 16 | 2 |

When the operator enters the rebar size information of Table I microprocessor 64 can then calculate the depth of concrete cover of any reinforcement bars located in the concrete structure under test in the manner set forth in the attached computer program listing.

Specifically, the R-METER DIVER TOOL math routines module of the attached computer program sets forth the equations for calculating the depth of reinforcing bar 34 within concrete structure 38. The general form of the equation for calculating the depth of reinforcing bar 34 within concrete structure 38 is as follows:

$$RCOV = A - B \cdot RRDG + C \cdot RSQR - D \cdot RCUBE + E \cdot RQUAD - F \cdot RQUIN$$

where:
$RSQR = RRDG \cdot RRDG$
$RCUBE = RRDG \cdot RSQR$
$RQUAD = RRDG \cdot RCUBE$
$RQUIN = RRDG \cdot RQUAD$ RRDG is the analog input signal in volts to channel 3 of Data Acquisition Module 114 and RCOV is the depth in inches of reinforcing bar 34 within concrete structure 38.

For example, when reinforcing bar 34 has a rebar number of 2 or 3 and the operator uses keypad 130 to enter the rebar number, the depth of reinforcing bar 34 is calculated using the following equation which begins at numeric label 20 of the module:

$$RCOV = 6.24659 - 10.9779 \cdot RRDG + 11.9107 \cdot RSQR - 6.19846 \cdot RCUBE + 1.46032 \cdot RQUAD - 0.127000 \cdot RQUIN$$

The R-METER DIVER TOOL math routines module of the attached computer program also provides an equation at numeric label 22 of the module for calculating the depth of reinforcing bar 34 when the rebar number is four or five; an equation at numeric label 24 of the module for calculating the depth of reinforcing bar 34 when the rebar number is six or seven and an equation at numeric label 26 of module for calculating the depth of reinforcing bar 34 when the rebar number is eight or nine beginning.

If the rebar number for reinforcing bar 34 is between ten and sixteen the following equation, set forth at numeric label 28 of the math routines module, is used to calculate the depth of reinforcing bar 34:

$$RCOV = 8.70667 - 15.0919 RRDG + 16.7952 \cdot RSQR - 8.90859 \cdot RCUBE + 2.13634 \cdot RQUAD - 0.189275 \cdot RQUIN$$

For reinforcing bars having a rebar number greater than 16 the R-METER DIVER TOOL math routines module of the attached computer program does not calculate the depth of the reinforcing bar within the concrete structure.

It should be noted that the expression RNUM.NE (not rebar number) is used to determine which equation of the math routines module calculates the depth of reinforcing bar 34 within concrete structure 38. When, for examples, the rebar bar number entered via keypad 130 is four the math routines module will skip the equation at numeric label 20 of the math routines module proceeding to numeric label 22 of the math routines module to calculate the depth of reinforcing bar 34 within concrete structure 38.

After completing the inspection of the underwater concrete structure, the test results from the inspection can be transferred via RS232 module 116 to a printer 132 in a report format. This report typically includes the following information which is entered by the operator using keypad 130, FIG. 5 or provided by microcomputer 112 as a result of the testing of an underwater concrete structure. This report includes the location of the concrete structure under test; the depth of each measurement, the rebar number for each reinforcement bar within the structure under test and the depth of concrete cover over each reinforcement bar for each structure under test.

Referring to FIG. 2b and 5, keypad 130 is used by the operator to input certain digital data/information into microcomputer 112 such as the location of the concrete structure under test and the rebar number for each rebar within the structure. When the operator desires to enter data into microcomputer 112 a sixteen bit key encoder 134 which is electrically coupled to keypad 130 provides a logic zero to one transition at its DA output (data available). This logic zero to one transition clocks the logic one at the D input of Flip-Flop 136 to the Q output thereof which causes the not Q output of Flip-Flop 136 to transition from the logic one to the logic zero state thereby providing an interrupt to the /RSTA input of power supply 113. This interrupt provided by Flip-Flop 136 indicates to microcomputer 112 that encoder 134 is ready to provide data to microcomputer 112.

At this time it should be noted that the encoder used in the preferred embodiment of the present invention is a CMOS key encoder, Model MM74C992 16 Key Encoder manufactured by National Semiconductor and the keypad is a Grayhill Series 845 keypad with custom legends.

Referring to FIG. 5 the functions of the keys on keypad 130 are briefly described as follows: L selects the alpha character located in the left hand corner of each alphanumeric key; M selects the alpha character located in the middle of each alphanumeric key and R selects the alpha character located in the right hand corner of each alphanumeric key. DELETE allows deletion of the last entry without affecting other data entered; SELECT allows a cursor to be moved around liquid crystal display 138 to select a desired function and DONE allows data entered into the static RAM module 118 of microcomputer 64 to be logged or executes the selected function. The alphanumeric keys "0–9, A–Z, +, −, SP" allow either numbers or letters to be entered into microcomputer 112 via encoder 134. Numbers are selected by pressing the desired key, while letters are entered by pressing a position key (either L, M or R) and the key with the desired letter on it. A blank space is generated by selecting the SP key.

The liquid crystal display 138 used in the preferred embodiment of the present invention is a 4 line by 40 character LCD display Model LM44A4C40CBW LCD manufactured by Densitron. Data provided by microcomputer 112 for display by liquid crystal display 138 is provided to a serial to parallel data converter 140 which converts the data from an eight bit serial word to an eight bit parallel word and then supplies each eight bit parallel word to liquid crystal display 138 for display thereby.

Referring to FIGS. 2a and 2c, data acquisition and processing circuit 14 also has a diver communications circuit which includes a microphone jack 124 adapted to receive a microphone, not shown, a diver earphone volume control 126 connected to jack 124, an amplifier 128 connected to volume control 126 and diver earphone 40 connected to the output of the amplifier 128. The diver communications circuit allows for ship to diver communication while the diver is using probe 18 to test an underwater concrete structure for concrete cover thickness over a reinforcing bar 34, FIG. 4.

From the foregoing, it may readily be seen that the subject invention comprises a new, unique and exceedingly useful nondestructive testing apparatus for measuring the depth of concrete cover over a reinforcement bar within a concrete structure which constitutes a considerable improvement over the known prior art. Obviously many modifications and variations of the present invention are possible in light of the above teachings. It is therefore to be understood that within the scope of the appended claims the invention may be practiced otherwise than as specifically described.

What is claimed is:

1. A measuring apparatus for the nondestructive testing of an underwater concrete structure said measuring apparatus being adapted to locate and determine the orientation of at least one reinforcing bar within an underwater concrete structure, said measuring apparatus comprising:

probe means for generating a magnetic field, said probe means being adapted for movement over the surface of said underwater concrete structure being tested such that whenever said reinforcing bar is placed within the magnetic field generated by said probe means the shape of said magnetic field is distorted indicating the location and orientation of said reinforcing bar;

means electrically coupled to said probe means for providing an analog signal in response to the distortion in the shape of said magnetic field by the presence of said reinforcing bar, said analog signal being indicative of the distance between said probe means and said reinforcing bar;

processing means having an analog signal input and a data input, said analog signal input receiving said analog signal from said analog signal providing means, said processing means converting said analog signal from said analog signal providing means into digital data and then sorting said digital data;

keypad means for entering via the data input of said processing means a rebar number for said reinforcing bar, the rebar number indicating the outside diameter of said reinforcing bar, said rebar number being an integer within a range of between two and sixteen;

said processing means responsive to the rebar number for said reinforcing bar and said analog signal calculating a parameter RCOV representing the depth of said reinforcing bar within said underwater concrete structure using the equation $$RCOV = A - B \cdot RRDG + C \cdot RSQR - D \cdot RCUBE + E \cdot RQUAD - F \cdot RQUIN$$

wherein RRDG is said analog signal and where,
RSQR = RRDG·RRDG and,
RCUBE = RRDG·RSQR and,
RQUAD = RRDG·RCUBE and,
RQUIN = RRDG·RQUAD; and
wherein A, B, C, D, E and F are variable parameters, all these parameters being determined by the rebar number for said reinforcing bar supplied to the data input of said processing means by said keypad means; and power supplying means for providing a direct current voltage to said processing means and said analog signal providing means;

said power supplying means having a self contained rechargeable battery electrically connected to said processing means and said analog signal providing means; and sensing circuit means for disconnecting said battery from said processing means and said signal generating means when said battery discharges below a predetermined voltage, said predetermined voltage being about 11.3 volts.

2. The measuring apparatus of claim 1 wherein said sensing circuit means comprises:

a switch having a normally open contact, the normally open contact of said switch when closed electrically connecting said self contained rechargeable battery to said processing means and said analog signal providing means, the contact of said switch having a first terminal connected to said self contained rechargeable battery and a second terminal;

a momentary contact switch having a first terminal connected to said self contained rechargeable battery and a second terminal;

a voltage regulator having an input connected to the second terminal of said normally open contact of said switch and an output;

a DC to DC convertor having an input connected to the output of voltage regulator and an output;

a diode having a cathode connected to the output of DC to DC converter and an anode;

a transistor having an emitter, a base and a collector, the collector of said transistor being connected to the anode of said diode;

a zener diode having an anode connected to the base of said transistor and a cathode connected to the second terminal of said normally open contact of said switch;

a resistor having a first terminal connected to the base of said transistor and a second terminal connected to the output of said DC to DC converter; and a relay having a pair of coils and at least first and second contacts, the first coil of said relay being connected to the second terminal of said momentary contact switch such that when said momentary contact switch is closed said first coil is energized closing the first and second contacts of said relay the closure of the first contact of said relay electrically connecting said self contained rechargeable battery to said processing means and said analog signal providing means when the normally open contact of said switch is closed;

the closure of the second contact of said relay electrically connecting said self contained rechargeable battery to said voltage regulator;

the second coil of said relay being connected between the emitter of said transistor and the output of said voltage regulator such that when said transistor is turned on said second coil is energized, the first contact of said relay is opened electrically disconnecting said self contained rechargeable battery from said microprocessing means and said analog signal providing means and the second contact of said relay is opened electrically disconnecting said self contained rechargeable battery from said voltage regulator.

3. The measuring apparatus of claim 1 further comprising a printer electrically coupled to said processing means for providing a report indicative of the depth of said reinforcing bar within said underwater concrete structure being tested.

4. The measuring apparatus of claim 1 comprising a battery charger electrically connected to said rechargeable battery for recharging said battery when the voltage of said battery drops below said predetermined voltage.

5. The measuring apparatus of claim 1 further comprising an encoder electrically connected between said keypad means and the data input of said processing means.

6. The measuring apparatus of claim 1 comprising a liquid crystal display electrically coupled to said processing means.

7. The measuring apparatus of claim 1 comprising a pair of meters, each of said meters being electrically coupled to said analog signal providing means and each said meters being adapted to provide a visual indication of the location of said reinforcing bar within said underwater concrete structure.

* * * * *